US011370903B2

(12) United States Patent
Hung et al.

(10) Patent No.: US 11,370,903 B2
(45) Date of Patent: Jun. 28, 2022

(54) POLYPROPYLENE COMPOSITION AND DYEABLE POLYPROPYLENE FILAMENT YARN INCLUDING THE SAME

(71) Applicant: GUANG XIN POLYMER COMPOSITES CO., LTD, Taichung (TW)

(72) Inventors: Wen-Pin Hung, Taichung (TW); Hung-Chia Yen, Taichung (TW)

(73) Assignee: GUANG XIN POLYMER COMPOSITES CO., LTD, Taichung (TW)

(*) Notice: Subject to any disclaimer, the term of this patent is extended or adjusted under 35 U.S.C. 154(b) by 357 days.

(21) Appl. No.: 16/717,885

(22) Filed: Dec. 17, 2019

(65) Prior Publication Data

US 2021/0040297 A1 Feb. 11, 2021

(30) Foreign Application Priority Data

Aug. 8, 2019 (TW) .................................. 108128328

(51) Int. Cl.

| C08L 23/12 | (2006.01) |
| C08L 67/02 | (2006.01) |
| C08L 25/10 | (2006.01) |
| C08L 23/08 | (2006.01) |
| C08L 51/00 | (2006.01) |

(Continued)

(52) U.S. Cl.
CPC ............. *C08L 23/12* (2013.01); *C08L 23/083* (2013.01); *C08L 23/0838* (2013.01); *C08L 25/10* (2013.01); *C08L 51/003* (2013.01); *C08L 51/06* (2013.01); *C08L 67/02* (2013.01); *D01F 1/06* (2013.01); *C08L 2203/12* (2013.01); *C08L 2205/03* (2013.01)

(58) Field of Classification Search
CPC .................................. C08L 23/12; C08L 67/02
See application file for complete search history.

(56) References Cited

U.S. PATENT DOCUMENTS

| 5,298,557 A | * | 3/1994 | Fujita | ................. C08L 23/0869 |
| | | | | 525/64 |
| 5,780,155 A | * | 7/1998 | Ishizawa | ............ D04H 1/43832 |
| | | | | 428/374 |

(Continued)

FOREIGN PATENT DOCUMENTS

| TW | 200940761 A | 10/2009 |
| TW | 201224015 A | 6/2012 |
| TW | 201918516 A | 5/2019 |

OTHER PUBLICATIONS

Wang et al. Composites Part B 210, 108613 (Year: 2021).*

(Continued)

*Primary Examiner* — Mark S Kaucher
(74) *Attorney, Agent, or Firm* — Fox Rothschild LLP; Robert J. Sacco

(57) ABSTRACT

A polypropylene composition for a dyeable polypropylene filament yarn includes a polypropylene having a melt flow rate ranging from 30 g/10 min to 40 g/10 min, a polyester serving to modify the polypropylene and having a melt flow rate ranging from 40 g/10 min to 50 g/10 min, and a compatibilizer serving to improve compatibility between the polypropylene and the polyester. The polypropylene composition has a melt flow rate ranging from 30 g/10 min to 40 g/10 min.

16 Claims, 1 Drawing Sheet

(51) Int. Cl.
  *C08L 51/06* (2006.01)
  *D01F 1/06* (2006.01)

(56) References Cited

U.S. PATENT DOCUMENTS

| | | | | |
|---|---|---|---|---|
| 6,388,013 B1 * | 5/2002 | Saraf | ........................ | C08L 23/12 525/240 |
| 2005/0217037 A1 | 10/2005 | Negola | | |
| 2012/0034838 A1 * | 2/2012 | Li | ........................ | D04H 1/4291 525/190 |

OTHER PUBLICATIONS

Search Report appended to an Office Action, which was issued to Taiwanese counterpart application No. 108128328 by the TIPO on Sep. 22, 2020, with an English translation thereof.

* cited by examiner

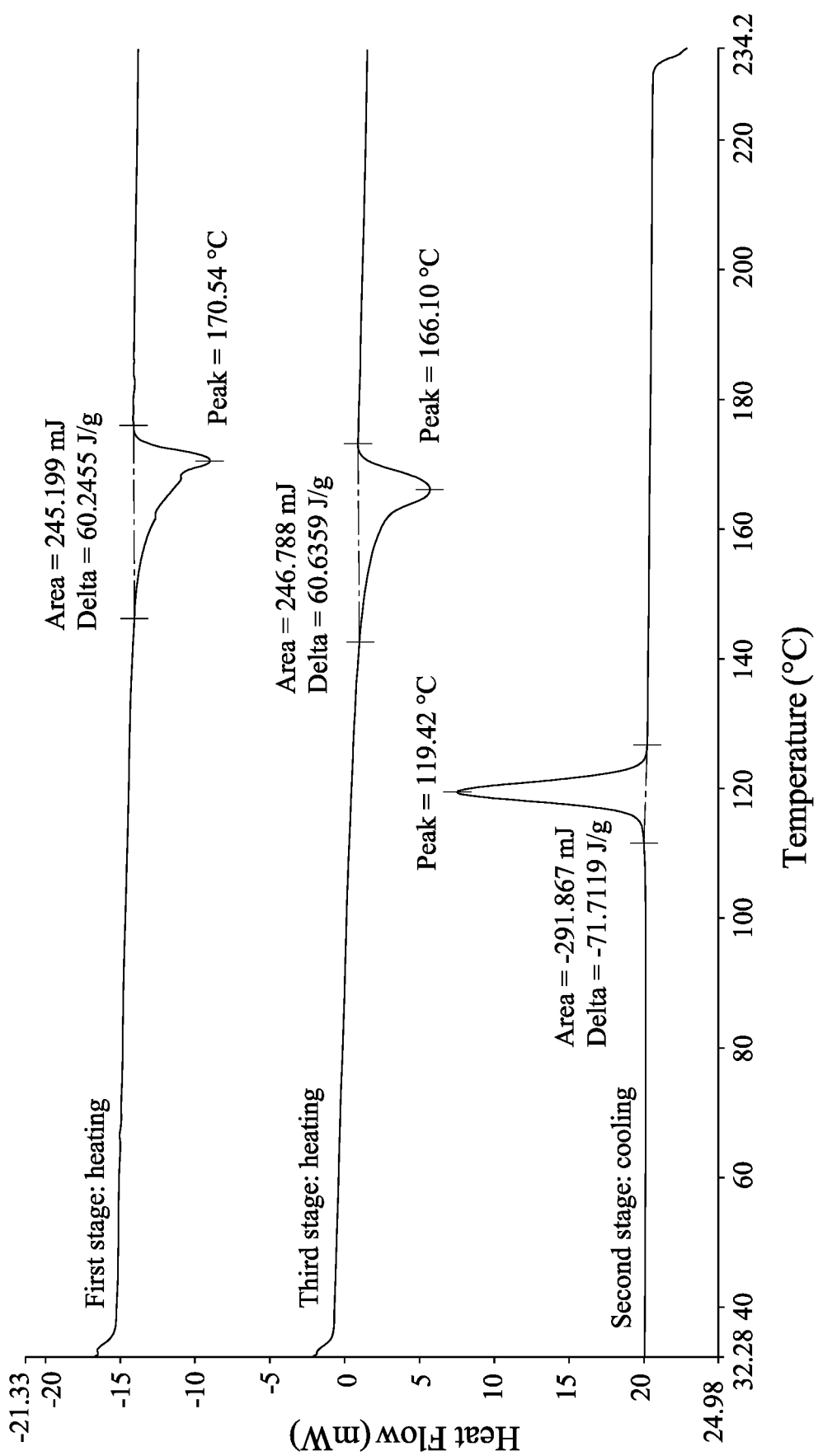

POLYPROPYLENE COMPOSITION AND DYEABLE POLYPROPYLENE FILAMENT YARN INCLUDING THE SAME

CROSS-REFERENCE TO RELATED APPLICATION

This application claims priority of Taiwanese Invention Patent Application No. 108128328, filed on Aug. 8, 2019.

FIELD

This disclosure relates to a polypropylene composition, and more particularly to a polypropylene composition for making a polypropylene filament yarn having good dyeability and spinnability. This disclosure also relates to a dyeable polypropylene filament yarn including the polypropylene composition.

BACKGROUND

A polypropylene filament yarn is a nonpolar filament yarn having a closely packed structure and high crystallinity, which makes it difficult for dye molecules to enter into the polypropylene filament yarn. As such, the dyeing of the polypropylene filament yarn can be especially problematic. In addition, the polypropylene filament yarn has low compatibility with conventional dyes and dyeing auxiliary agent due to low hydrophilicity thereof, and thus, conventional methods for dyeing and printing are ineffective to color the polypropylene filament yarn.

In order to improve dyeability of the polypropylene filament yarn, conventional techniques usually involves modifying the polypropylene with a modifier, so as to improve the adherence of the dye to the polypropylene filament yarn.

Taiwanese Patent Publication No. 200940761 discloses a dyeable polypropylene fiber made from a polypropylene composition, which includes a polypropylene, a copolyester for modifying the polypropylene, and a compatibilizer for increasing compatibility between the polypropylene and the copolyester. The copolyester is prepared by subjecting a mixture including terephthalic acid, ethylene glycol, and diethoxylated-2-methyl-1,3-propanediol to a polymerization reaction, and the polypropylene has a melt flow rate that ranges from 20 g/10 min to 28.3 g/10 min.

U.S. Patent Publication No. 2005/0217037 discloses a dyeable polyolefin fiber, which includes a polyolefin and a dye enhancer. The polyolefin may be a polypropylene, and the dye enhancer may be any terephthalate-based copolyester such as a 1,4-cyclohexanedimethanol-modified poly(ethylene terephthalate) copolyester. An example of the polyolefin is a polypropylene pellet with a melt flow rate of 14 dg/min, and an example of the dye enhancer is PETG No. 14285 purchased from Eastman Chemical Ltd.

However, although conventional techniques might improve the dyeability of the polypropylene filament yarn, such techniques fail to take into account the difference of the melt flow rate between the polypropylene and the modifier, and the effect of the modifier on the melt flow rate of the polypropylene composition, and thus, the polypropylene filament yarn including the polypropylene composition have inferior dyeability and spinnability.

SUMMARY

Therefore, a first object of the disclosure is to provide a polypropylene composition for improving dyeability and spinnability of a polypropylene filament yarn including the polypropylene composition.

A second object of the disclosure is to provide a dyeable polypropylene filament yarn including the polypropylene composition.

According to a first aspect of the disclosure, a polypropylene composition includes a polypropylene, a polyester serving to modify the polypropylene, and a compatibilizer serving to improve compatibility between the polypropylene and the polyester. The polypropylene has a melt flow rate ranging from 30 g/10 min to 40 g/10 min as measured according to ASTM D1238-13 at a load of 2.16 kg and a temperature of 230° C. The polyester has a melt flow rate ranging from 40 g/10 min to 50 g/10 min as measured according to ASTM D1238-13 at a load of 2.16 kg and a temperature of 230° C. The polypropylene composition has a melt flow rate ranging from 30 g/10 min to 40 g/10 min as measured according to ASTM D1238-13 at a load of 2.16 kg and a temperature of 230° C.

According to a second aspect of the disclosure, a dyeable polypropylene filament yarn includes the polypropylene composition of the first aspect of the disclosure.

BRIEF DESCRIPTION OF THE DRAWINGS

Other features and advantages of the disclosure will become apparent in the following detailed description of the embodiment(s) with reference to the accompanying drawings, in which:

FIG. 1 is a graph illustrating results of differential scanning calorimetry (DSC) analysis of a polypropylene composition of Example 3 according to the disclosure.

DETAILED DESCRIPTION

A polypropylene composition according to the disclosure includes a polypropylene having a melt flow rate ranging from 30 g/10 min to 40 g/10 min, a polyester serving to modify the polypropylene and having a melt flow rate ranging from 40 g/10 min to 50 g/10 min, and a compatibilizer serving to improve compatibility between the polypropylene and the polyester. The polypropylene composition has a melt flow rate ranging from 30 g/10 min to 40 g/10 min.

It should be noted that the "melt flow rate" described herein is a melt flow rate measured according to standard test method ASTM D1238-13 (published in 2013) at a load of 2.16 kg and a temperature of 230° C.

Generally, the lower a spinning temperature, the greater the denier per filament (DPF) of a polypropylene filament yarn obtained accordingly. In contrast, the higher the spinning temperature, the lower the DPF of the polypropylene filament yarn obtained accordingly. The lower the melt flow rate of a polypropylene, the greater the DPF of the polypropylene filament yarn obtained accordingly. In contrast, the higher the melt flow rate of the polypropylene, the lower the DPF of the polypropylene filament yarn obtained accordingly. It is worth noting that, in certain embodiments, the spinning temperature is set at 230° C. With a polypropylene having a melt flow rate ranging from 30 g/10 min to 40 g/10 min and a polyester having a melt flow rate ranging from 40 g/10 min to 50 g/10 min, the polypropylene composition according to the disclosure may have a melt flow rate ranging from 30 g/10 min to 40 g/10 min at 230° C. A dyeable polypropylene filament yarn including the polypropylene composition having the aforesaid conditions may have a superior spinnability, and the DPF of the dyeable polypropylene filament yarn may in a desirable range of from 0.5 to 1.5.

The polyester suitable for the disclosure may be any polyester that has a melt flow rate which satisfies the aforementioned range as measured according to ASTM D1238-13 at a load of 2.16 kg and a temperature of 230° C., but is not limited thereto. In certain embodiments, the polyester is a polyethylene terephthalate modified by neopentyl glycol. Specifically, the polyester is prepared by subjecting a mixture of terephthalic acid, ethylene glycol, and neopentyl glycol to a polycondensation reaction. The polycondensation reaction may be implemented under any condition well-known in the art, and the conditions thereof may be modified accordingly.

In certain embodiments, the polyester is in an amount ranging from 8 wt % to 25 wt % based on a total weight of the polypropylene composition. When the amount of the polyester is within the aforesaid range, the dyeable polypropylene filament yarn of the disclosure may possess better dyeability and colorfastness to washing, and also have superior spinnability and filament strength. In certain embodiments, the polyester is in an amount ranging from 8 wt % to 20 wt % based on the total weight of the polypropylene composition. In certain embodiments, the polyester is in an amount ranging from 10 wt % to 15 wt % based on the total weight of the polypropylene composition.

The compatibilizer suitable for the disclosure may be any conventional compatibilizer used for improving the compatibility between polypropylene and polyethylene terephthalate, but is not limited thereto. In certain embodiments, the compatibilizer is selected from a maleic anhydride-grafted styrene-ethylene-butadiene-styrene copolymer, a maleic anhydride-grafted polypropylene, or a combination thereof. In certain embodiments, the compatibilizer is the maleic anhydride-grafted styrene-ethylene-butadiene-styrene copolymer, which improves stability of the polypropylene and the polyester during the spinning process.

In certain embodiments, the compatibilizer is in an amount ranging from 2 wt % to 8 wt % based on the total weight of the polypropylene composition. When the amount of the compatibilizer is within the aforesaid range, the polypropylene and the polyester has superior compatibility and the polypropylene composition may have an adequate viscosity, such that the dyeable polypropylene filament yarn including the polypropylene composition may have good spinnability. In certain embodiments, the compatibilizer is in an amount ranging from 3 wt % to 5 wt % based on the total weight of the polypropylene composition.

The dyeable polypropylene filament yarn of the disclosure includes the aforementioned polypropylene composition. In certain embodiments, the dyeable polypropylene filament yarn may be a partially oriented yarn (PDY), a drawn textured yarn (DTY), a fully oriented yarn (FOY), or a spin drawn yarn (SDY), but is not limited thereto.

In certain embodiments, the dyeable polypropylene filament yarn is the partially oriented yarn, which is made by spinning the polypropylene composition.

The polypropylene composition may be spun using any conventional apparatus and conditions suitable for producing the partially oriented yarn, but is not limited thereto. In certain embodiments, the polypropylene composition may be spun at a temperature of 230° C.

In certain embodiments, the dyeable polypropylene filament yarn is the drawn textured yarn, which is made by spinning the polypropylene composition to obtain the partially oriented yarn, and then subjecting the partially oriented yarn to a draw-texturing process, so as to obtain the drawn textured yarn. As described above, the polypropylene composition may be spun using any conventional apparatus and conditions suitable for producing the partially oriented yarn, but is not limited thereto. In addition, the draw-texturing process may be performed using any conventional apparatus and conditions suitable for producing the drawn textured yarn, but is not limited thereto.

In certain embodiments, the dyeable polypropylene filament yarn has a DPF ranging from 0.5 to 1.5.

Subsequent applications of the dyeable polypropylene filament yarn may be, for example, a dyeable polypropylene fabric including a plurality of the dyeable polypropylene filament yarns of the disclosure, with the plurality of the dyeable polypropylene filament yarns being the drawn textured yarns.

Examples of the disclosure will be described hereinafter. It is to be understood that these examples are exemplary and explanatory and should not be construed as a limitation to the disclosure.

Example 1

1. Preparation of a Polypropylene Composition:

A polyester (Manufacturer: Dragon Special Resin; Model: TL-3015; prepared by subjecting terephthalic acid, ethylene glycol and neopentyl glycol to a polycondensation reaction) having a melting temperature ranging from 190° C. to 200° C. and a melt flow rate of 42 g/10 min was pre-dried at 65° C. for 6 hours. Subsequently, a polypropylene of 89 wt % (Manufacturer: ExxonMobil; Model: PP3155E5) and having a melting temperature of 164.15° C. and a melt flow rate of 36.0 g/10 min, the pre-dried polyester of 8 wt %, and a compatibilizer of 3 wt % (a maleic anhydride-grafted styrene-ethylene-butadiene-styrene copolymer; Manufacturer: Kraton; Model: FG1901) were blended and pelletized to obtain a polypropylene composition of 100 wt % and having a melt flow rate of 35.1 g/10 min. The melt flow rates of the polypropylene, the pre-dried polyester, the compatibilizer, and the thus obtained polypropylene composition were measured according to the standard test method ASTM D1238-13 at a load of 2.16 kg and a temperature of 230° C.

2. Production of Partially Oriented Yarns (POY):

The polypropylene composition was subjected to melt spinning using a spinning machine to obtain partially oriented yarns (90D/72f), each of which has a DPF of 1.25. The spinning machine includes a spinneret and an extruder (L/D=30/1) having a first zone, a second zone, a third zone, and a fourth zone. The conditions for the melt spinning process include the following: a temperature of 180° C. at the first zone of the extruder; a temperature of 230° C. at the second zone of the extruder; a temperature of 230° C. at the third zone of the extruder; a temperature of 230° C. at the fourth zone of the extruder; a temperature of 230° C. of the spinneret; a spinning speed of 3500 m/min; the cooling wind speed of 0.5 m/min; and an oil pick up (OPU) of 1.0%.

3. Production of Draw Textured Yarns (DTY):

The partially oriented yarns were subjected to a draw-texturing process using a draw-texturing machine (Manufacturer: Murata; Model: 33H) to obtain drawn textured yarns (75D/72f), each of which has a DPF of 1.04. The conditions for the draw-texturing process include the following: a draw-texturing speed of 200 m/min, a draw ratio (DR1/DR2) of 1.2, an oil pick up of 1.9%, and an interlace number of 135 points/meter.

4. Production of Weft Knitted Fabric

The drawn textured yarns were weft knitted to obtain a weft knitted fabric in a form of a garter.

Examples 2 to 4

The procedures and conditions for preparing the polypropylene composition, the partially oriented yarns, the drawn textured yarns, and the weft knitted fabric of each of Examples 2 to 4 were similar to those of Example 1, except that the amounts of the polypropylene and the polyester in the polypropylene composition of each of Examples 2 to 4 were varied as shown in Table 1.

Comparative Example 1

The procedures and conditions for preparing the polypropylene composition, the partially oriented yarns, the drawn textured yarns, and the weft knitted fabric of Comparative Example 1 were similar to those of Example 1, except that the polypropylene composition of Comparative Example 1 is composed of 100% polypropylene (i.e., lacking the polyester and the compatibilizer) as shown in Table 2.

Comparative Example 2

The procedures and conditions for preparing the polypropylene composition, the partially oriented yarns, the drawn textured yarns, and the weft knitted fabric of Comparative Example 2 were similar to those of Example 1, except that the polyester used in Comparative Example 2 is different from that of Example 1. The polyester used in Comparative Example 2 is a poly (ethylene terephthalateco-1, 4-cylclohexylenedimethylene terephthalate) (PETG; Manufacturer: SK Chemicals; Model: SKYGREEN K2012) made by subjecting a mixture of terephthalic acid, ethylene glycol, and 1, 4-cyclohexanedimethanol to a polycondensation reaction. The PETG polyester has a melt flow rate of 8 g/10 min as measured according to ASTM D1238-13 at a load of 2.16 kg and a temperature of 230° C.

Comparative Example 3

The procedures and conditions for preparing the polypropylene composition, the partially oriented yarns, the drawn textured yarns, and the weft knitted fabric of Comparative Example 3 were similar to those of Comparative Example 2, except that the amounts of the polypropylene and the polyester in the polypropylene composition of Comparative Example 3 were varied as shown in Table 2.

<Property Evaluations>

The polypropylene compositions, the partially oriented yarns, the drawn textured yarns, and the weft knitted fabrics of Examples 1 to 4 and Comparative Examples 1 to 3 were selectively evaluated with the following tests. The results are shown in Tables 1 and 2 and FIG. 1.

1. Melt Flow Rate (MFR):

The melt flow rate (in g/10 min) of each of the polypropylene, the polyester, and the polypropylene composition was measured using a melt flow indexer (Manufacturer: Gotech Testing Machines Inc.; Model: GT-7200) according to ASTM D1238-13 at a load of 2.16 kg and a temperature of 230° C.

2. Compatibility:

4.070 mg of the polypropylene composition of Example 3 was subjected to an analysis using a differential scanning calorimeter (Manufacturer: PerkinElmer; Model: DSC8500) under the following conditions: (1) a first stage: heating from 30° C. to 230° C. at a heating rate of 10° C./min, and maintaining at 230° C. for 1 minute; (2) a second stage: cooling from 230° C. to 30° C. at a cooling rate of 10° C./min, and maintaining at 30° C. for 1 minute; and (3) a third stage: heating again from 30° C. to 230° C. at a heating rate of 10° C./min, and maintaining at 230° C. for 1 minute. The results are shown in FIG. 1.

3. Spinnability:

The spinnability of the partially oriented yarn was evaluated based on a frequency of filament breakage on a single spindle during an 8-hour period of the melt spinning process. The spinnability was evaluated according to the standards below:

good: when the frequency of filament breakage is less than 1;

fair: when the frequency of filament breakage ranges from 1 to 3; and poor: when the frequency of filament breakage is greater than 3.

4. Processability of Drawn Textured Yarn (DTY):

The processability of the drawn textured yarn was evaluated based on the frequency of filament breakage on a single spindle during an 8-hour period of the draw-texturing process. The processability of the drawn textured yarn was evaluated according to the standards below:

good: when the frequency of filament breakage is less than 1;

fair: when the frequency of filament breakage ranges from 1 to 3; and poor: when the frequency of filament breakage is greater than 3.

5. Filament Strength:

Filament strength (in g/d) of the partially oriented yarn and that of the drawn textured yarn were tested using a tensile strength tester (Manufacturer: Gotech Testing Machines Inc.; Model: AL-1000-U) according to ASTM D3822.

6. Filament Elongation at Break:

Filament elongation at break (in %) of the partially oriented yarn and that of the drawn textured yarn were tested using a tensile strength tester (Manufacturer: Gotech Testing Machines Inc.; Model: AL-1000-U) according to ASTM D3822.

7. Dye Intensity:

The weft knitted fabric was dyed with a disperse dye to obtain a dyed fabric. The disperse dye includes a black dye (purchased from RI ITS Trading Co., Ltd.; Model: Black HWE) in an amount of 3% o.w.f. (on-weight-fabric) based on a total weight of the disperse dye, a blue dye (purchased from Riits Trading Co., Ltd.; Model: Blue DXF) in an amount of 0.5% o.w.f., and a brown dye (purchased from RIITS Trading Co., Ltd.; Model: Brown HW-XFN) in an amount of 2% o.w.f. The dyeing process includes the following: a) a dyeing step implemented at a temperature of 110° C. for 40 minutes; b) a soaping step implemented using an auxiliary (purchased from Bozzetto Group; Model: PERMULSIN DNMS C) with a concentration of 2 g/l at a temperature of 50° C. for 20 minutes; and c) a setting step implemented at a temperature of 130° C. for 30 seconds.

Subsequently, a dye intensity (L value) of the dyed fabric was measured using a spectrophotometer (Manufacturer: Datacolor; Model: 650). The dye intensity ranges from 0 to 100, in which 0 represents the highest dye intensity (black), and 100 represents the lowest dye intensity (white).

8. Colorfastness to Washing:

A colorfastness to washing of the weft knitted fabric was tested according to AATCC 61-2A. The colorfastness to washing is evaluated based on 5 ranks, in which rank 1 represents the least satisfactory colorfastness to washing, and rank 5 represents the most satisfactory colorfastness to washing.

TABLE 1

|  |  |  | Example 1 | Example 2 | Example 3 | Example 4 |
|---|---|---|---|---|---|---|
| Polypropylene composition | Polypropylene | Type | PP3155E5 | | | |
| | | MFR (g/10 min) | 36 | 36 | 36 | 36 |
| | | Amount (wt %) | 89 | 85 | 82 | 77 |
| | Polyester | Type | TL-301S | | | |
| | | MFR (g/10 min) | 42 | 42 | 42 | 42 |
| | | Amount (wt %) | 8 | 12 | 15 | 20 |
| | Compatibilizer | Type | FG-1901 | | | |
| | | Amount (wt %) | 3 | 3 | 3 | 3 |
| | | MFR (g/10 min) | 35.1 | 35.3 | 35.6 | 35.8 |
| POY | Filament strength (g/d) | | 3.58 | 3.12 | 3.74 | 3.05 |
| | Filament Elongation at Break (%) | | 58.34 | 47.96 | 64.30 | 45.68 |
| | Spinnability (spinning speed: 3500 m/min) | | Good | Good | Good | Fair |
| DTY | Filament strength (g/d) | | 4.02 | 3.98 | 4.28 | 3.86 |
| | Filament Elongation at Break (%) | | 34.6 | 33.2 | 29.5 | 27.6 |
| | Processability of DTY (draw-texturing speed: 200 m/min) | | Good | Good | Good | Fair |
| Weft Knitted Fabric | Black Dye | Dye Intensity L value | 46.25 | 34.65 | 16.96 | 15.68 |
| | | Color-fastness to Washing (of each fabric) Acetate | 2-3 | 3-4 | 4 | 4 |
| | | Cotton | 2-3 | 3-4 | 4 | 4-5 |
| | | PA66 | 1-2 | 2-3 | 4 | 4 |
| | | PET | 2-3 | 3-4 | 4 | 4-5 |
| | | Acrylic | 3-4 | 4 | 4-5 | 4-5 |
| | | Wool | 2-3 | 3-4 | 4 | 4 |
| | Blue Dye | Dye Intensity L value | 70.05 | 62.68 | 51.35 | 50.20 |
| | | Color-fastness to Washing (of each fabric) Acetate | 2-3 | 3-4 | 4 | 4 |
| | | Cotton | 2-3 | 3-4 | 4-5 | 4-5 |
| | | PA66 | 1-2 | 2-3 | 4 | 4 |
| | | PET | 2-3 | 3-4 | 4 | 4-5 |
| | | Acrylic | 3-4 | 4 | 4-5 | 4-5 |
| | | Wool | 2-3 | 3-4 | 4 | 4-5 |
| | Brown Dye | Dye Intensity L value | 68.25 | 58.52 | 40.05 | 38.86 |
| | | Color-fastness to Washing (of each fabric) Acetate | 2-3 | 4 | 4-5 | 4 |
| | | Cotton | 2-3 | 3-4 | 4-5 | 4-5 |
| | | PA66 | 1-2 | 3-4 | 4 | 4 |
| | | PET | 2-3 | 3-4 | 4 | 4-5 |
| | | Acrylic | 3-4 | 4 | 4-5 | 4-5 |
| | | Wool | 2-3 | 3-4 | 4 | 4-5 |

TABLE 2

|  |  |  | Comparative Example 1 | Comparative Example 2 | Comparative Example 3 |
|---|---|---|---|---|---|
| Polypropylene composition | Polypropylene | Type | PP3155E5 | | |
| | | MFR (g/10 min) | 36 | 36 | 36 |
| | | Amounts (wt %) | 100 | 89 | 82 |
| | Polyester | Type | — | K2012 | K2012 |
| | | MFR (g/10 min) | — | 8.0 | 8.0 |
| | | Amounts (wt %) | 0 | 8 | 15 |
| | Compatibilizer | Type | — | FG-1901 | FG-1901 |
| | | Amounts (wt %) | 0 | 3 | 3 |
| | | MFR (g/10 min) | 36 | 26.2 | 21.5 |
| POY | Filament strength (g/d) | | 3.52 | 3.42 | 1.58 |
| | Filament Elongation at Break (%) | | 63.85 | 52.32 | 38.68 |
| | Spinnability (spinning speed: 3500 m/min) | | Good | Fair | Poor |
| DTY | Filament strength (g/d) | | 4.05 | 3.65 | 1.95 |
| | Filament Elongation at Break (%) | | 38.6 | 40.8 | 28.6 |
| | Processability of DTY (draw-texturing speed: 200 m/min) | | Good | Fair | Poor |
| Weft Knitted Fabric | Black Dye | Dye Intensity L value | 84.82 | 45.24 | Weft knitted fabric was severely damaged. |
| | | Color-fastness to Washing (of each fabric) Acetate | 1 | 2-3 | |
| | | Cotton | 1 | 2-3 | |
| | | PA66 | 1 | 1-2 | |
| | | PET | 1 | 3-4 | |
| | | Acrylic | 1 | 3-4 | |

TABLE 2-continued

|  |  |  | Comparative Example | | |
|---|---|---|---|---|---|
|  |  |  | 1 | 2 | 3 |
| Blue Dye | Dye Intensity | Wool L value | 1 87.05 | 2-3 68.33 | |
|  | Color-fastness to Washing (of each fabric) | Acetate | 1 | 2-3 | |
|  |  | Cotton | 1 | 2-3 | |
|  |  | PA66 | 1 | 2-3 | |
|  |  | PET | 1 | 2-3 | |
|  |  | Acrylic | 1-2 | 3-4 | |
|  |  | Wool | 1 | 2-3 | |
| Brown Dye | Dye Intensity | L value | 85.23 | 66.52 | |
|  | Color-fastness to Washing (of each fabric) | Acetate | 1 | 2-3 | |
|  |  | Cotton | 1 | 2-3 | |
|  |  | PA66 | 1 | 2-3 | |
|  |  | PET | 1 | 2-3 | |
|  |  | Acrylic | 1-2 | 3-4 | |
|  |  | Wool | 1 | 2-3 | |

As shown in FIG. 1, the polypropylene composition of Example 3 exhibits a melting peak at 166.10° C. in the third stage of the differential scanning calorimetry analysis. As compared to the melting temperature (i.e., 164.15° C.) of the polypropylene, the melting temperature of the polypropylene composition of Example 3 is shown to be slightly higher. This result indicates an excellent compatibility among the polypropylene, the polyester and the compatibilizer of the polypropylene composition of Example 3.

As shown in Tables 1 and 2, each of the weft knitted fabrics of Examples 1 to 4 exhibits a greater dye intensity (smaller L value) and a greater colorfastness to washing as compared to the weft knitted fabric of Comparative Example 1, in which the polyester and the compatibilizer were omitted. This result indicates that addition of the polyester and the compatibilizer to the polypropylene is a crucial factor for improving the dyeability of the dyeable polypropylene filament yarn that includes the polypropylene composition.

In addition, the spinnability and the filament strength of the partially oriented yarns of Example 1 to 4 are shown to be not much different from those of the partially oriented yarns of Comparative Example 1, in which the polyester and the compatibilizer were omitted. Similarly, the processability and the filament strength of the drawn textured yarns of Examples 1 to 4 are shown to be almost similar to those of the drawn textured yarn of Comparative Example 1. The results indicate that, in each of Examples 1 to 4, when the polypropylene is modified by adding the compatibilizer and the polyester having a melt flow rate ranging from 40 g/10 min to 50 g/10 min to form the polypropylene composition, the dyeable polypropylene filament yarn that includes the polypropylene composition can have better spinnability, filament strength, and processability, while maintaining satisfactory dyeability.

As compared to Comparative Example 2, in which the amount of the polyester is the same but the melt flow rate thereof is significantly lower than that of the polyester of Example 1, the partially oriented yarns of Example 1 exhibit better spinnability, and the drawn textured yarns of Example 1 exhibit better processability. The results indicate that, by modifying the polypropylene with the polyester having a melt flow rate ranging from 40 g/10 min to 50 g/10 min, the polyester may have a higher compatibility with the polypropylene, and therefore the dyeable polypropylene filament yarn may have better spinnability as well as better processability.

As compared to the partially oriented yarns of Comparative Example 3, in which the melt flow rate of the polyester is significantly low, each of the partially oriented yarns of Example 1 to 4 exhibits better spinnability, filament strength, and filament elongation at break. In addition, each of the drawn textured yarns of Examples 1 to 4 also exhibits better processability, filament strength, and filament elongation at break compared to the drawn textured yarns of Comparative Example 3. Further, since the drawn textured yarn of Comparative Example 3 has a filament strength that is too low to bear the strength applied during the weft-knitting process, the weft knitted fabric of Comparative Example 3 was severely damaged, and therefore was not analyzed for the dye intensity or the colorfastness to washing.

Moreover, as compared to Comparative Example 3, in which the amount of the polyester is the same but the melt flow rate thereof is significantly lower than that of the polyester of Example 3, the polyester of Example 3 has great compatibility with the polypropylene, and the dyeability of the dyeable polypropylene filament yarn is significantly increased in Example 3. In other words, in Comparative Example 3, the melt flow rate of the polyester was not controlled within a specific range as defined herein, and thus, the compatibility between the polyester and the polypropylene exhibits a significant decrease, and the dyeable polypropylene filament yarn thus made has poor spinnability and processability, which in turn causes the weft knitted fabric made from the dyeable polypropylene filament yarn to be severely damaged during the weft-knitting process.

In sum, by modifying the polypropylene that has a specific melt flow rate, and with the compatibilizer and the polyester having a melt flow rate that is compatible with that of the polypropylene, the polypropylene composition of the disclosure has great dyeability, spinnability, and processability, which in turn confers good mechanical properties in terms of filament strength and filament elongation at break to the dyeable polypropylene filament yarn made from the polypropylene composition.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A polypropylene composition, comprising:
    a polypropylene having a melt flow rate ranging from 30 g/10 min to 40 g/10 min, as measured according to ASTM D1238-13 at a load of 2.16 kg and a temperature of 230° C.;
    a polyester serving to modify said polypropylene, said polyester having a melt flow rate ranging from 40 g/10 min to 50 g/10 min, as measured according to ASTM D1238-13 at a load of 2.16 kg and a temperature of 230° C.; and
    a compatibilizer serving to improve compatibility between said polypropylene and said polyester,
    wherein said polypropylene composition has a melt flow rate ranging from 30 g/10 min to 40 g/10 min, as measured according to ASTM D1238-13 at a load of 2.16 kg and a temperature of 230° C., and
    wherein said polyester is prepared by subjecting a mixture of terephthalic acid, ethylene glycol and neopentyl glycol to a polycondensation reaction.

2. The polypropylene composition according to claim 1, wherein said polyester is in an amount ranging from 8 wt % to 25 wt % based on a total weight of said polypropylene composition.

3. A polypropylene composition, comprising:
    a polypropylene having a melt flow rate ranging from 30 g/10 min to 40 g/10 min, as measured according to ASTM D1238-13 at a load of 2.16 kg and a temperature of 230° C.;
    a polyester serving to modify said polypropylene, said polyester having a melt flow rate ranging from 40 g/10 min to 50 g/10 min, as measured according to ASTM D1238-13 at a load of 2.16 kg and a temperature of 230° C.; and
    a compatibilizer serving to improve compatibility between said polypropylene and said polyester,
    wherein said polypropylene composition has a melt flow rate ranging from 30 g/10 min to 40 g/10 min, as measured according to ASTM D1238-13 at a load of 2.16 kg and a temperature of 230° C., and
    wherein said compatibilizer is selected from the group consisting of a maleic anhydride-grafted styrene-ethylene-butadiene-styrene copolymer, a maleic anhydride-grafted polypropylene, and a combination thereof.

4. The polypropylene composition according to claim 1, wherein said compatibilizer is in an amount ranging from 2 wt % to 8 wt % based on a total weight of said polypropylene composition.

5. A dyeable polypropylene filament yarn, comprising the polypropylene composition according to claim 1.

6. The dyeable polypropylene filament yarn according to claim 5, which is selected from the group consisting of a partially oriented yarn, a drawn textured yarn, a fully oriented yarn, and a spin drawn yarn.

7. The dyeable polypropylene filament yarn according to claim 6, which is said partially oriented yarn.

8. The dyeable polypropylene filament yarn according to claim 6, which is said drawn textured yarn.

9. The dyeable polypropylene filament yarn according to claim 5, which has a denier per filament ranging from 0.5 to 1.5.

10. The polypropylene composition according to claim 3, wherein said polyester is in an amount ranging from 8 wt % to 25 wt % based on a total weight of said polypropylene composition.

11. The polypropylene composition according to claim 3, wherein said compatibilizer is in an amount ranging from 2 wt % to 8 wt % based on a total weight of said polypropylene composition.

12. A dyeable polypropylene filament yarn, comprising the polypropylene composition according to claim 3.

13. The dyeable polypropylene filament yarn according to claim 12, which is selected from the group consisting of a partially oriented yarn, a drawn textured yarn, a fully oriented yarn, and a spin drawn yarn.

14. The dyeable polypropylene filament yarn according to claim 13, which is said partially oriented yarn.

15. The dyeable polypropylene filament yarn according to claim 13, which is said drawn textured yarn.

16. The dyeable polypropylene filament yarn according to claim 12, which has a denier per filament ranging from 0.5 to 1.5.

* * * * *